June 17, 1958 D. L. COSPER 2,839,168
PEDAL CONTROL MECHANISM FOR ELECTRIC POWERED VEHICLES
Filed Oct. 27, 1955 2 Sheets-Sheet 1
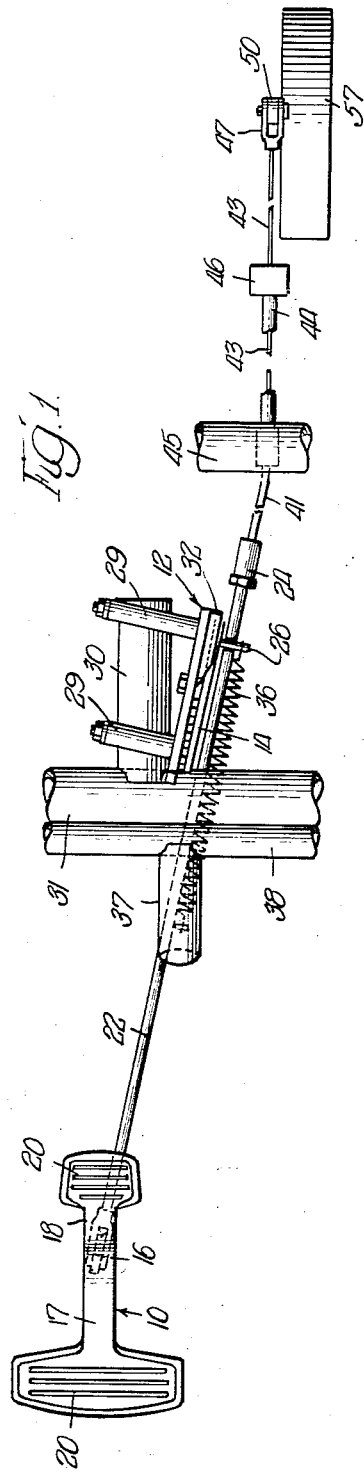
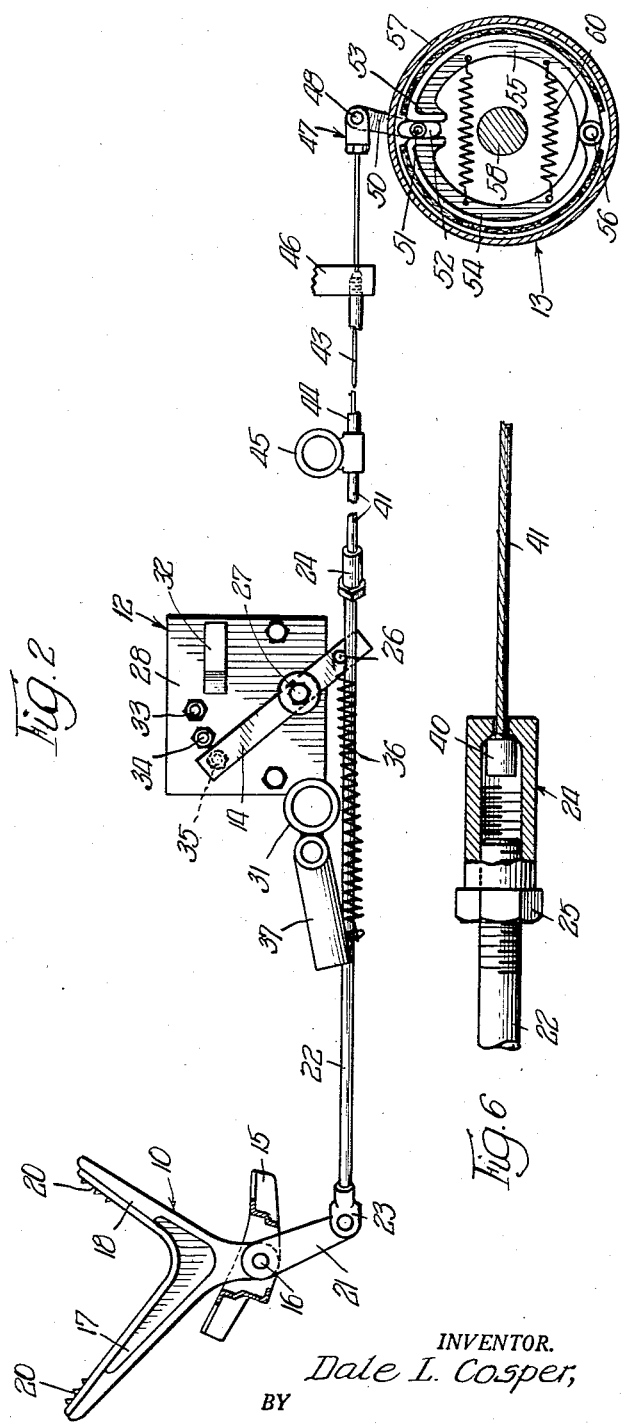
INVENTOR.
Dale L. Cosper,
BY
Wilkinson Huxley Byron & Hume
Attys.

June 17, 1958 D. L. COSPER 2,839,168
PEDAL CONTROL MECHANISM FOR ELECTRIC POWERED VEHICLES
Filed Oct. 27, 1955 2 Sheets-Sheet 2
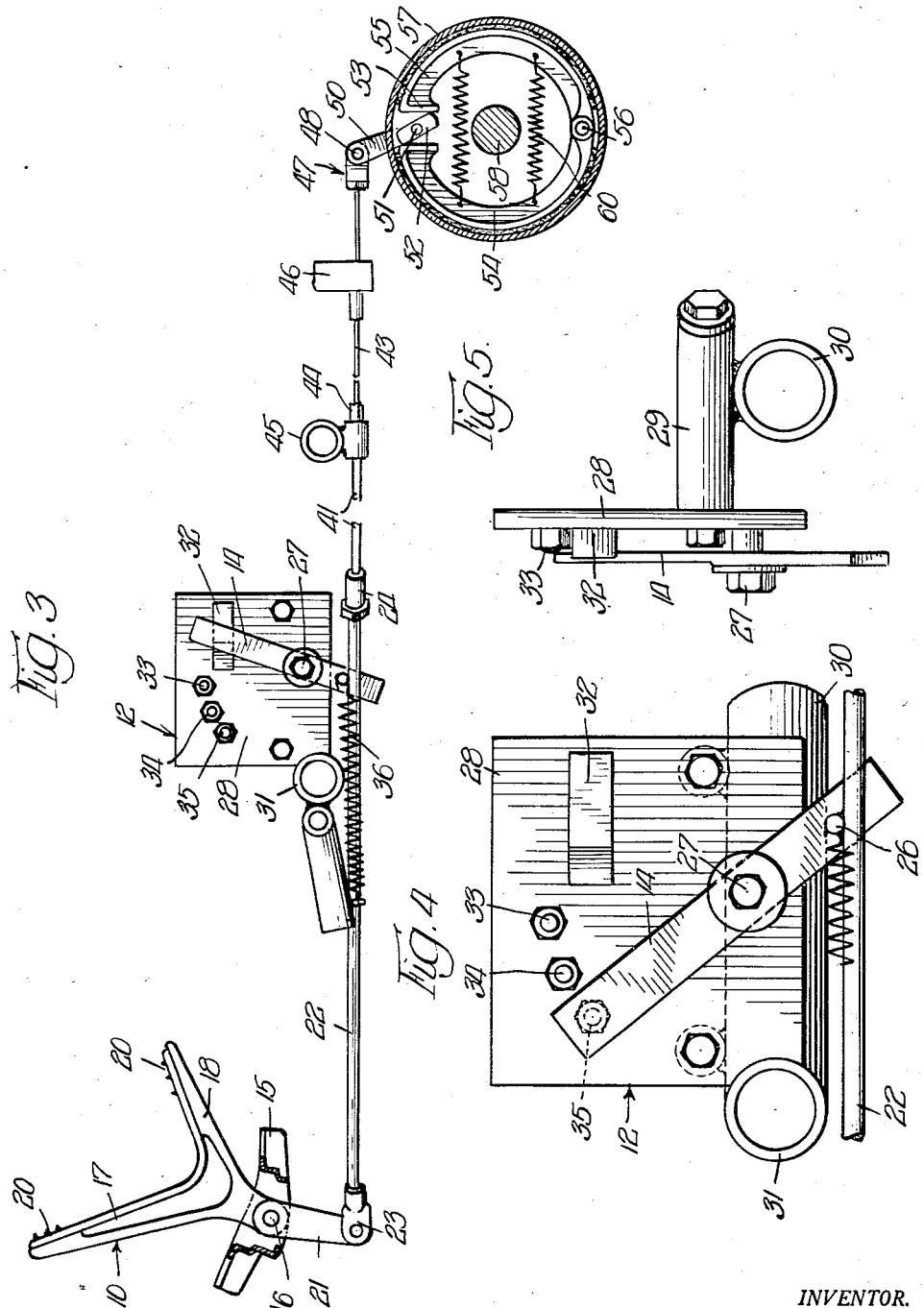
INVENTOR.
Dale L. Cosper,
BY

2,839,168

PEDAL CONTROL MECHANISM FOR ELECTRIC POWERED VEHICLES

Dale L. Cosper, South Bend, Ind., assignor to Versal, Inc., South Bend, Ind., a corporation of Indiana Application October 27, 1955, Serial No. 543,091

3 Claims. (Cl. 192—2)

The invention relates to electric powered cars of the three or four wheel type and has reference more particularly to a golf car having a pair of motor driven rear wheels and which additionally incorporates a single pedal control for dual actuation of the speed control switch and the braking structure and wherein the single pedal control is so located as to permit either occupant to operate the car without interchange of position.

The primary object of the invention is to provide pedal control mechanism for an electric car of the type described which will be operative for manipulating the electric switch to thereby control the speed of the car and for simultaneously actuating the braking mechanism of the car, said control mechanism being so constructed and arranged that the brakes are released when current is supplied to the electric motor and are automatically applied when the current supply is terminated.

Another and more specific object of the invention is to provide a single control pedal for incorporation in electric cars which will not only effect simultaneous control of both the electric speed switch and the braking mechanism but which will be so located centrally of the floor of the car as to permit either occupant to manipulate the pedal without changing his position.

A further object is to provide a single control pedal for an electric car of the three or four wheel type which when actuated in one direction will release the brakes and turn on the electric current and which when actuated in a reverse direction will terminate the electric current supply and apply the brakes.

Another and more specific object resides in the provision of novel and improved control mechanism for an electric car wherein said mechanism incorporates a single control pedal which must be positively actuated in a certain direction to supply electric current to the car and which when released is resiliently urged by a coil spring in a direction to apply the brakes, so that automatically with release of the pedal the electric current supply is terminated and the car is gradually brought to a stop.

With these and various objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a top plan view of the control mechanism of the invention and which shows the single control pedal of the mechanism operatively connected to the electric switch and to the brake mechanism of the car;

Figure 2 is a side elevational view of the control mechanism of Figure 1 showing the control pedal in position for releasing the brakes and for supplying electric current;

Figure 3 is a view similar to Figure 2 but showing the control pedal in position for terminating the supply of electric current and for applying the brake;

Figure 4 is an enlarged front elevational view of the electric switch panel for the control mechanism;

Figure 5 is an end elevational view of the electric switch panel as shown in Figure 4; and Figure 6 is a detail sectional view of the brake adjusting sleeve incorporated in the control mechanism of the invention.

Referring more particularly to the drawings which disclose a preferred embodiment of the invention, the control mechanism includes the single foot pedal identified by numeral 10 which is operatively connected to the electric switch structure 12 and to conventional internal brake mechanism 13. Actuation of the foot pedal 10 into the position as shown in Figure 2 will release the brake mechanism 13 and will simultaneously actuate the lever 14 of the electric switch structure to supply electric current to the car. When the foot pedal 10 is actuated into the position as shown in Figure 3 the pivoted arms of the brake mechanism are expanded to apply the brake, and the lever 14 of the electric switch structure 12 is rotated in an inoperative position, thus terminating the supply of electric current.

The foot pedal 10 is pivoted to frame 15 of the car as at 16, the pivot 16 being located approximately centrally of the floor of the car so that the pedal can be conveniently actuated by either of the two occupants. When the occupant sitting on the right hand side is driving the car he steers with his left hand and actuates the control pedal with his left foot, whereas, when the occupant on the left side of the car is driving, he steers with his right hand and actuates the control pedal with his right foot. The pedal 10 simulates a Y-shaped bracket with diverging extensions 17 and 18 each retaining a friction pad such as 20 at their respective terminal ends. The depending lever 21 has connection with the pedal at the pivot 16 and said lever depends below the frame 15 of the car for connection with rod 22 by means of clevis 23. At its opposite end rod 22 terminates in the brake adjusting sleeve 24 which has threaded connection therewith and is held in adjusted position on the end of the rod 22 by means of nut 25. Rod 22 at its end adjacent the brake adjusting sleeve 24 has the actuating pin 26 suitably welded thereto in transverse relation with the rod so that the pin projects on respective sides of the rod. Said pin extends through an opening in the lower end of switch lever 14, the said lever being pivoted at 27 to the electric switch panel 28. Thus rod 22, through the actuating pin 26, is operatively connected to switch 14 whereby to cause oscillating movement of the lever as the rod 22 may reciprocate back and forth due to actuation thereof by the control pedal 10. The electric panel 28 is suitably secured to the supports 29 which may be welded to a tube such as 30 extending laterally from one of the main tubular supports such as 31 of the car. The panel is equipped with an "off" contact such as the cam portion 32 and said panel is additionally provided with a plurality of "on" contacts identified by numerals 33, 34 and 35. Contact 33 will comprise the low speed terminal, with 34 functioning as an intermediate speed terminal, and 35 as the high speed terminal.

In accordance with the invention rod 22 is tensioned in a direction to automatically locate switch lever 14 in "off" position when the control pedal 10 is released. For this purpose the coil spring 36 is provided, the same having connection at its right hand end with the actuating pin 26 and having connection at its opposite end with the fixed tube 37. Said tube forms part of the frame structure since it extends laterally from the main tube 38 which has a welded connection with support 31.

The brake adjusting sleeve 24 retains the head 40 of the cable 41 which extends forwardly of the car for connection with a Bowden wire assembly including the control wire 43, the sheath 44 and the fixed supports 45 and 46 which form part of the car. The Bowden wire 43 projects beyond support 46 for connection with the clevis 47 of the brake mechanism 13. Clevis 47 has pivotal connection at 48 with the lever 50 which is pivotally mounted by means of the pivot shaft 51. The said pivot shaft is provided with the cam 52 which has location between the camming surfaces 53 of the brake shoes 54 and 55. The shoes are pivoted to each other at 56 and the same have location within the drum 57 of the brake mechanism 13, the said drum being suitably secured to the operating shaft 58 so as to rotate therewith. The movable shoes 54 and 55 of the brake mechanism are tensioned by means of springs 60 into a contracted position, in which position of said shoes the brake is released.

Operation of the pedal control mechanism of the invention is effected by the foot of the operator, the same being applied against the pad 20 of the diverging extension 17 to locate the pedal control in the position as shown in Figure 2 for operation of the car. The foot of the operator can be placed against pad 20 of the diverging extension 18 when in the position of Figure 3 to apply the brakes for stopping the car. In accordance with the invention, the pedal control 10 is automatically rotated from the operating position of Figure 2 to the braking position of Figure 3 by means of the coil spring 36. It will of course be understood that the coil spring 36 is effective, immediately upon release of the control pedal by the operator, to cause rotation of the switch lever 14 into its "off" position, Figure 3, thus terminating the supply of electric current. The tension of spring 36 is also effective to cause an expanding action of the brake shoes 54 and 55 with the result that the brake is applied in a manner to gradually bring the car to a stop. Spring 36 will therefore overcome the tension of the springs 60, having connected relation with the brake shoes 54 and 55. The said shoes are not only expanded by spring 36 upon release of the control pedal by the operator but the spring additionally functions to hold the shoes expanded and the brake applied during the time the electric car is at rest.

Should the operator desire to start operation of the car he places his foot on extension 17 of the control pedal, Figure 3, and rotates the same counterclockwise. This rotating movement of the control pedal will move rod 22 to the right and due to the pivotal connection of pin 26 with the switch lever the said switch lever is rotated so that it moves off of the cam portion 32. The switch lever first of all will engage contact 33 and electric current is supplied to the motor of the car to start travel of the same. Simultaneously with actuation of switch 14 it will be understood that tension on the Bowden wire 43 will have been released and the coil springs 60 therefore become operative to collapse the brake shoes 54 and 55, thus releasing the brake. As control pedal 10 is rotated into the position of Figure 2 the switch lever 14 will have moved from contact 33 to intermediate contact 34 and finally to high speed contact 35. However, the brake shoes remain released during this further rotation of the switch lever 14, the said action of the various parts being permitted by reason of the brake adjusting sleeve 24 and the lost motion connection provided thereby. It will be observed that the head 40 of the cable 41 may have movement within the sleeve 24 between the right hand end of the sleeve and the left terminal end of the rod 22. This lost motion connection between rod 22 and cable 41 permits the necessary movement of the rod for rotating the switch lever 14 into high speed position without disturbing the released position of the brake shoes.

The brake adjusting sleeve 24 and the lost motion connection provided thereby is also operative during the time the control pedal is rotated from the current "on" position of Figure 2 to the brake applied position of Figure 3. As described the control pedal will rotate in this clockwise direction as a result of the tension applied by coil spring 36. Initial actuation of rod 22 in a direction toward the left will rotate switch lever 14 in a clockwise direction to thereby return the lever to the cam portion 32 and terminate the supply of electric current. When the lever initially reaches cam portion 32, the brake adjusting sleeve 24 will have taken up all lost motion and head 40 of cable 41 will be located at the right hand end of the sleeve as shown in Figure 6. Tension is thus applied to cable 41 and so the Bowden wire 43 is pulled to the left, which action is effective to rotate lever 50 and cam 52 for applying the brake.

The single control pedal of the invention can be incorporated in golf cars and the like such as employ an electric motor for driving the rear wheels of the car. The contacts 33, 34 and 35 and the switch lever 14 are electrically connected in the motor circuit and they control the starting, stopping and the speed of the car. The brake means may be conventional with the brake shoes being applied when the cable 43 is pulled to the left and said shoes automatically releasing upon release of the cable.

The invention is not to be limited to or by details of construction of the particular embodiment thereof illustrated by the drawings as various forms of the device will of course be apparent to those skilled in the art without departing from the spirit of the invention or the scope of the claims.

What is claimed is:

1. In a vehicle of the electric powered type, the combination with an electric switch lever and a brake actuating lever, of a pedal control lever supported for oscillating movement to and from an operating position for effecting movement of the vehicle to a brake applied position for stopping movement of the vehicle and holding the same at rest, a member connecting the pedal control lever with the brake actuating lever, said member also having connection with the electric switch lever, brake means adapted to be operated by the brake actuating lever, a switch panel presenting a plurality of switch contacts for coaction with the electric switch lever whereby to control the speed of the car, said pedal control lever and connecting member being so arranged and having such connection with the electric switch lever as to effect release of the brake means and engagement of the electric switch lever with one of said contacts when the pedal control lever is located in operating position, and to render the brake means operative for applying the brakes and to locate the electric switch lever out of engagement with the contacts when the pedal control lever is in the brake applied position, and a brake adjusting sleeve interposed in the connecting member for adjusting the length of said member and which additionally provides a lost motion connection for the brake means.

2. A vehicle of the electric powered type as defined by claim 1, additionally including resilient means for yieldingly holding the pedal control lever and the member and parts connected thereto in a brake applied position.

3. In a vehicle adapted to be propelled by an electric motor, in combination, an electric switch panel presenting a plurality of electric contacts, a switch lever pivoted to the panel and adapted to engage the contacts upon rotation of the lever for controlling the starting, stopping and speed of the car, brake means including a brake actuating lever for actuating the said brake means to either apply or release the brakes, a pedal control lever supported for oscillating movement, a connecting rod joining the pedal control lever with the switch lever, a cable member connecting the end of the rod beyond its connection with the switch lever to the brake actuating lever, a brake adjusting sleeve interposed in said cable member, said connecting rod and cable member being so arranged and having such connection with the parts that for a first position of the pedal control lever the switch lever is located out of engagement with the contacts and the cable member is tensioned to actuate the brake means for applying the brakes, and for a second position of the pedal control lever the switch lever is caused to engage the contacts and the tension on the cable member is released for releasing the brakes, and a coil spring having connected relation with the rod for yieldingly holding the rod and thus the pedal control lever in said first position.

References Cited in the file of this patent
UNITED STATES PATENTS 1,556,586    Carr  ------------------ Oct. 13, 1925